(12) United States Patent
Klassen

(10) Patent No.: US 11,391,366 B2
(45) Date of Patent: Jul. 19, 2022

(54) ELECTROMAGNETICALLY OPERATED BAND BRAKE

(71) Applicant: GENESIS ROBOTICS AND MOTION TECHNOLOGIES CANADA, ULC, Langley (CA)

(72) Inventor: James Brent Klassen, Surrey (CA)

(73) Assignee: GENESIS ROBOTICS AND MOTION TECHNOLOGIES CANADA, ULC, Langley (CA)

( * ) Notice: Subject to any disclaimer, the term of this patent is extended or adjusted under 35 U.S.C. 154(b) by 373 days.

(21) Appl. No.: 16/621,694

(22) PCT Filed: Jun. 18, 2018

(86) PCT No.: PCT/IB2018/054480
§ 371 (c)(1),
(2) Date: Dec. 12, 2019

(87) PCT Pub. No.: WO2018/229737
PCT Pub. Date: Dec. 20, 2018

(65) Prior Publication Data
US 2020/0124163 A1    Apr. 23, 2020

Related U.S. Application Data

(60) Provisional application No. 62/534,484, filed on Jul. 19, 2017, provisional application No. 62/521,447, filed on Jun. 17, 2017.

(51) Int. Cl.
*F16D 49/08* (2006.01)
*F16H 57/10* (2006.01)
(Continued)

(52) U.S. Cl.
CPC ............ *F16H 57/10* (2013.01); *F16D 49/08* (2013.01); *F16D 65/14* (2013.01); *F16H 1/2863* (2013.01);
(Continued)

(58) Field of Classification Search
CPC ...... F16D 49/08; F16D 65/065; F16D 65/067; F16D 2121/18; F16D 2121/20; F16D 2121/22
See application file for complete search history.

(56) References Cited

U.S. PATENT DOCUMENTS 2,589,119 A    3/1952 Oleary
4,788,463 A *  11/1988 Layh ................ F16D 51/00
                                           188/161
(Continued)

FOREIGN PATENT DOCUMENTS

CN    204647064 U    9/2015
FR    2329898 A1 *  5/1977 ............. F16D 49/08
WO    2017046767 A1  3/2017

OTHER PUBLICATIONS

Machine translation of FR 2329898 (no date).*
(Continued)

*Primary Examiner* — Nicholas J Lane

(57) ABSTRACT

A torque transfer device has a ring gear and inner and outer planet gear sets, which may not be orbiting but rotating in fixed positions relative to a housing. One of the gear sets may comprise compound gears. There may also be a sun gear connected to a planet gear set. The sun gear may be an input and the ring gear an output for a reducing gear system to act as a torque amplifier. The gears may be tapered and there may also be an axial force applied to one of the gear sets to tighten the meshing between the tapered gears. One
(Continued)

of the gear sets, for example a gear set to which an axial force is applied, may be floating.

4 Claims, 17 Drawing Sheets

(51) Int. Cl.
    *F16D 65/14*     (2006.01)
    *F16H 1/28*     (2006.01)
    *F16H 1/36*     (2006.01)
    F16D 121/20     (2012.01)
    F16D 121/22     (2012.01)

(52) U.S. Cl.
    CPC ........... *F16H 1/36* (2013.01); *F16D 2121/20* (2013.01); *F16D 2121/22* (2013.01)

(56) References Cited

U.S. PATENT DOCUMENTS

| | | |
|---|---|---|
| 6,123,640 A | 9/2000 | Schulz |
| 11,022,191 B1* | 6/2021 | Marcus ................... F16D 65/16 |
| 2005/0109564 A1* | 5/2005 | Bai ........................ F16D 49/08 188/71.1 |
| 2018/0195563 A1* | 7/2018 | Barbulescu ............. F16D 49/08 |
| 2020/0088268 A1* | 3/2020 | Klassen .................. F16H 55/08 |
| 2020/0284308 A1* | 9/2020 | Bondoux ............. F16D 65/065 |

OTHER PUBLICATIONS

Machine translation of CN 204647065 (no date).*
Supplementary Partial European Search Report received for EP Application No. 18818606.8, dated Jan. 22, 2021, 13 Pages.
International Preliminary Report on Patentability for International Application No. PCT/IB2018/054480, dated Dec. 26, 2019, pp. 6.
International Search Report and Written Opinion for International Application No. PCT/IB2018/054480, dated Oct. 25, 2018, pp. 9.

* cited by examiner

ELECTROMAGNETICALLY OPERATED BAND BRAKE

CROSS REFERENCE TO RELATED APPLICATIONS

This application claims priority to PCT Application No. PCT/IB2018/054480, filed on Jun. 18, 2018, which claims the benefit of U.S. Provisional Application No. 62/521,447, filed Jun. 17, 2017 and 62/534,484 filed on Jul. 19, 2017, which are is incorporated herein by reference in their entirety.

TECHNICAL FIELD

Gear boxes.

BACKGROUND

Gear boxes are often used to increase torque in a system above what a motor can provide. These gearboxes often introduce backlash and significant inertia into the system. It is desirable to minimize added inertia and eliminate backlash while still providing high output torque.

SUMMARY

There is provided a torque transfer device having a housing and a ring gear having tapered ring gear teeth, the ring gear mounted for rotation relative to the housing. The torque transfer device also has plural first planet gears and plural second planet gears, the plural second planet gears having second tapered teeth arranged to mesh with the tapered ring gear teeth, the plural first planet gears having first tapered teeth arranged to mesh with the second tapered teeth, the plural second planet gears arranged within the ring gear to mesh with the ring gear, and each of the plural first planet gears being arranged to mesh with two of the plural second planet gears. Biasing elements bias the plural first planet gears or the plural second planet gears to tighten the meshing between the first tapered teeth and the second tapered teeth.

In various embodiments, there may be included any one or more of the following features: the biasing elements may be for biasing the plural second planet gears. The plural second planet gears may be floating gears. The tapered ring gear teeth, first tapered teeth and second tapered teeth may be mirrored helical teeth. The plural first planet gears may be compound gears, the compound gears comprising first simple gears having the first tapered teeth and second simple gears fixedly connected to the first simple gears to rotate with the first simple gears, and there may be a sun gear arranged to mesh with second simple gears. The second simple gears may be larger than the first simple gears. The plural first planet gears may be axially movable relative to the housing, and the second simple gears may have third tapered teeth and the sun gear may have tapered sun gear teeth, the third tapered teeth arranged to mesh with tapered sun gear teeth. The tapered sun gear teeth and third tapered teeth may be mirrored helical teeth. The biasing elements may include permanent magnets. The biasing elements may include electromagnets. The biasing elements may include permanent magnets and electromagnets. The biasing elements may include springs. There may also be a brake for stopping the torque transfer device in the event of a loss of power. The brake may be arranged to grip a cylindrical surface connected to at least one of the plural first planet gears. The brake may be a brake or combined brake as described below.

There is also provided a brake including a band having a first end and a second end, the band extending circumferentially around a surface of a rotating object, the band being movable between a gripping position contacting the surface of the rotating object and an energized position. A first permanent magnet is attached to the first end of the band and a second permanent magnet attached to the second end of the band. The first and second permanent magnets are arranged to attract each other in the gripping position to cause the band to grip the cylindrical surface. The first permanent magnet and the second permanent magnet are biased away from the energized position to move the band to the gripping position, but one or more electromagnets are supplied with current to attract the first permanent magnet and the second permanent magnet to hold the band in the energized position against the bias when current is supplied to the electromagnets.

In various embodiments, there may be included any one or more of the following features: the one or more electromagnets may be configured to be energized with a first current to move the band from the gripping position to the energized position, and a second current to maintain the band in the energized position, the second current being lower than the first current. The first permanent magnet and the second permanent magnet may be biased away from the energized position by the magnetic attraction of the first permanent magnet and the second permanent magnet.

There is also provided a combined brake comprising plural brakes as described above, the plural brakes being arranged in a circular arrangement, the bands of each brake of the plural brakes being connected to successive brakes of the plural brakes by flexible bridges. The one or more electromagnets of each of the plural brakes may comprise two electromagnets, each of the two electromagnets being shared with a respective adjacent brakes of the plural brakes.

These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

Figure 1:
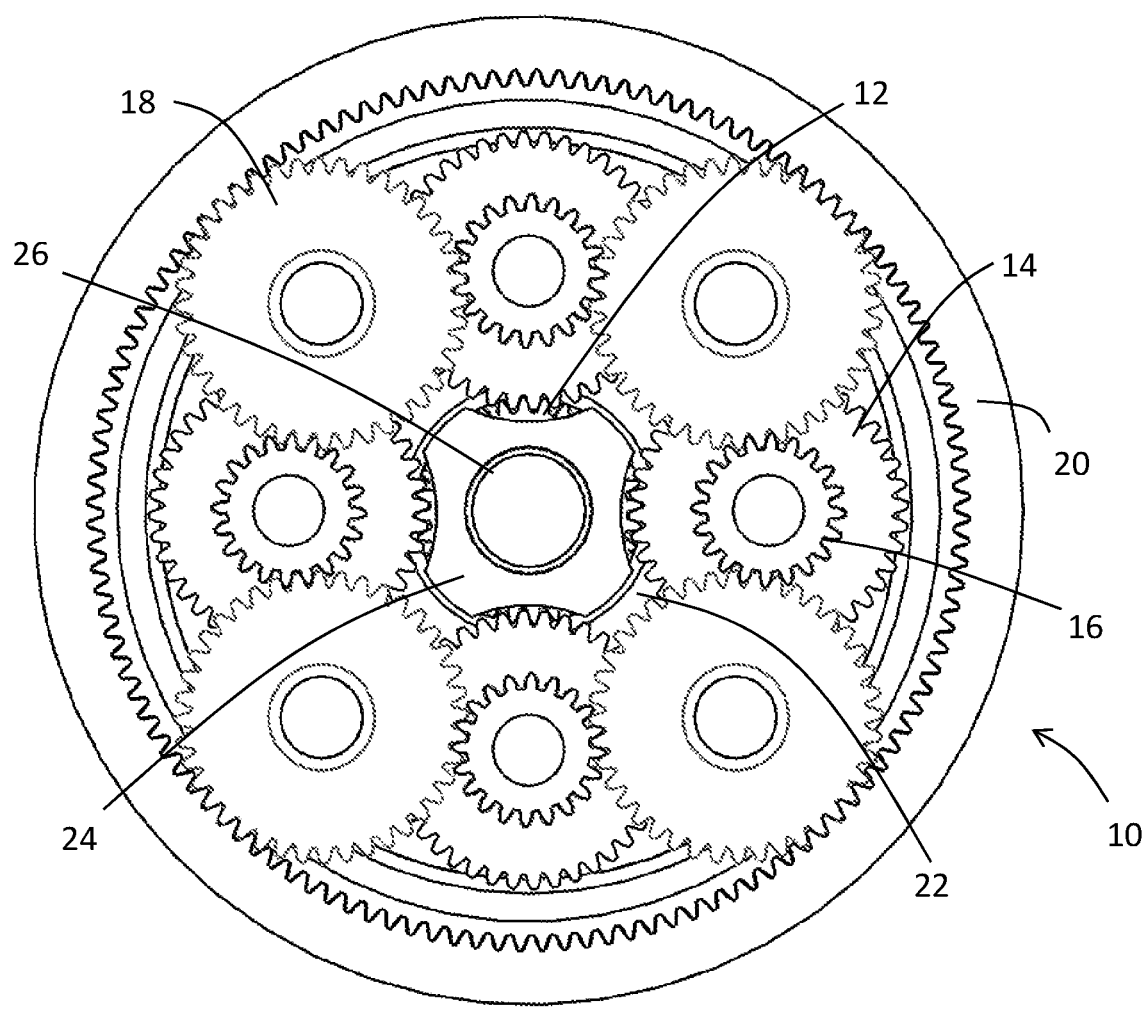
FIG. 1 is a plan view of an exemplary torque amplifier.
Figure 2:
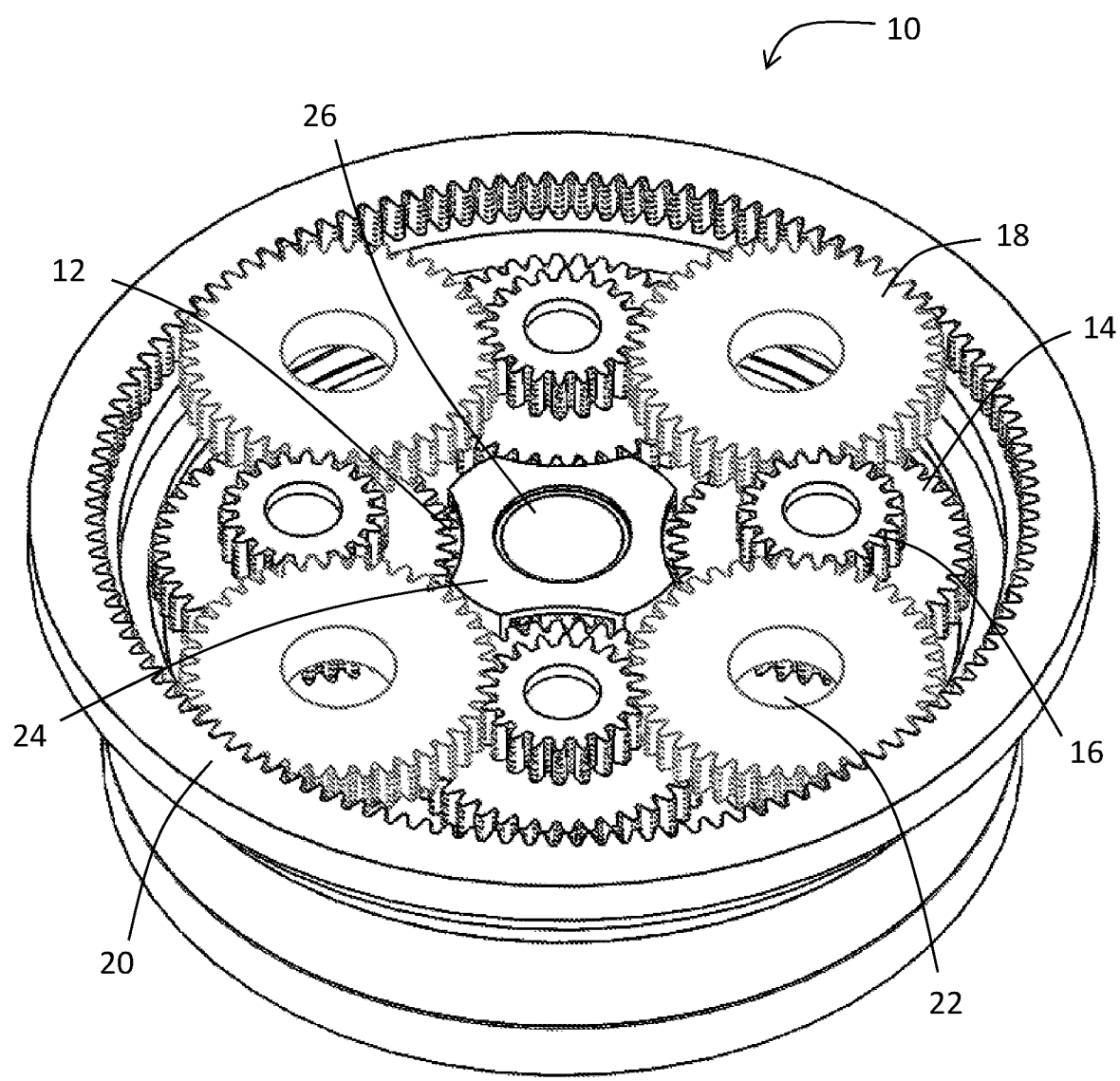
FIG. 2 is a perspective view of the torque amplifier of FIG. 1.
Figure 16:
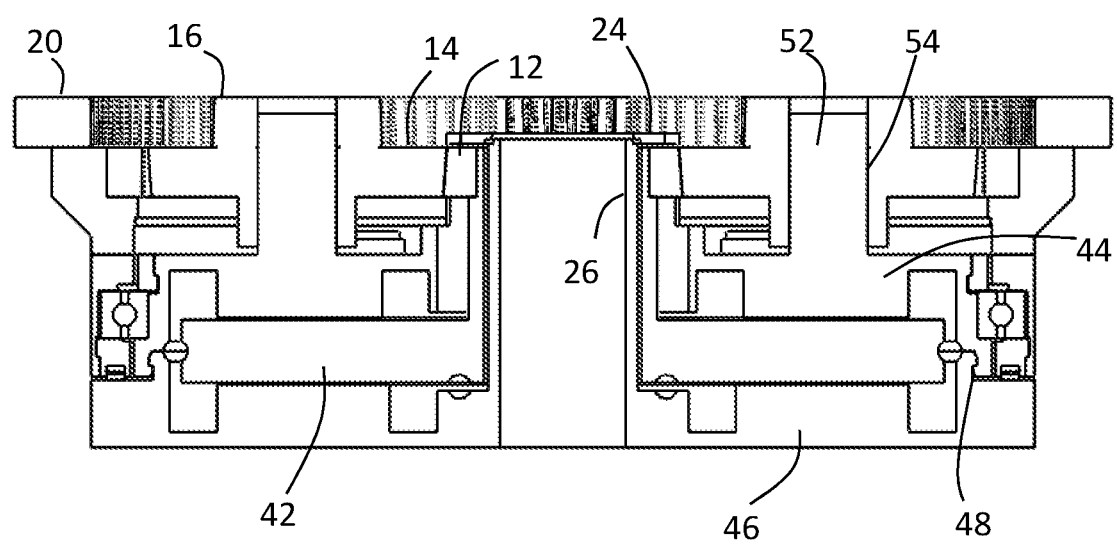
FIG. 16 is a side cutaway view of an actuator having an electric motor and a torque amplifier as shown in FIGS. 1-3.

A non-limiting exemplary embodiment of a torque amplifier 10 is shown in FIG. 1 in plan view and in FIG. 2 in perspective view. The torque amplifier 10 in this embodiment is a gearing system having a sun gear 12, an array of first planet gears, which are here compound gears including larger gears 14 that mesh with the sun gear 12 and smaller gears 16, an array of second planet gears 18 that mesh with the smaller gears 16, and a ring gear 20 that meshes with the array of second planet gears 18. The smaller gears 16 and larger gears 14 here are fixed together to make up compound first planet gears, but the smaller gears 16 could be otherwise connected to the larger gears 14 to rotate with the first larger gears 14. Here, the sun gear 12 is an input which is fixed to a motor rotor and the ring gear 20 is an output. In this embodiment, the larger gears 14 and their associated smaller gears 16 are rotationally fixed to the housing 22 which in this exemplary embodiment comprises the back of a stator of an electric motor. The sun gear 12 as shown in FIGS. 1 and 2 is under a cap 24 fixed to the housing 22. The cap 24 may serve as a connection between the back of the stator and a shaft 26 connected to another part of the housing, in this case an additional stator of the electric motor, as shown in FIG. 16. The second planet gears 18 in this embodiment of the device also do not orbit the sun relative to the housing. Rather, their rotational axis is in a fixed position relative to the housing. This eliminates the need for a planet carrier with the advantage of reduced complexity and the potential for high stiffness.

The term "planet" in this document does not imply that the planets orbit; rather it describes positioning, such as within a ring gear, around a sun gear, or contacting pairs of other planet gears.

In the embodiment shown, there are four of each of the first planet gears each comprising a larger gear 14 and smaller gear 16, and four second planet gears 18, but other numbers of gears could be used. Torque amplification is obtained by the sun gear 12 being smaller than the ring gear 20 and by the smaller gears 16 being smaller than the larger gears 14 of the first planet gears. The smaller diameter gears 16 are fixed to the top of the larger gears 14 which provides an additional gear reduction as the smaller gears 16 drive the array of second planet gears 18. The smaller gears 16 could also be, for example, under the first planet gears 14. The array of second planet gears 18 then drives the outer ring gear 20 (output). This set of second planets 18 is unique in that each gear floats in place and takes up any backlash with the use of an applied downward magnetic force, as described below.

Figure 3:
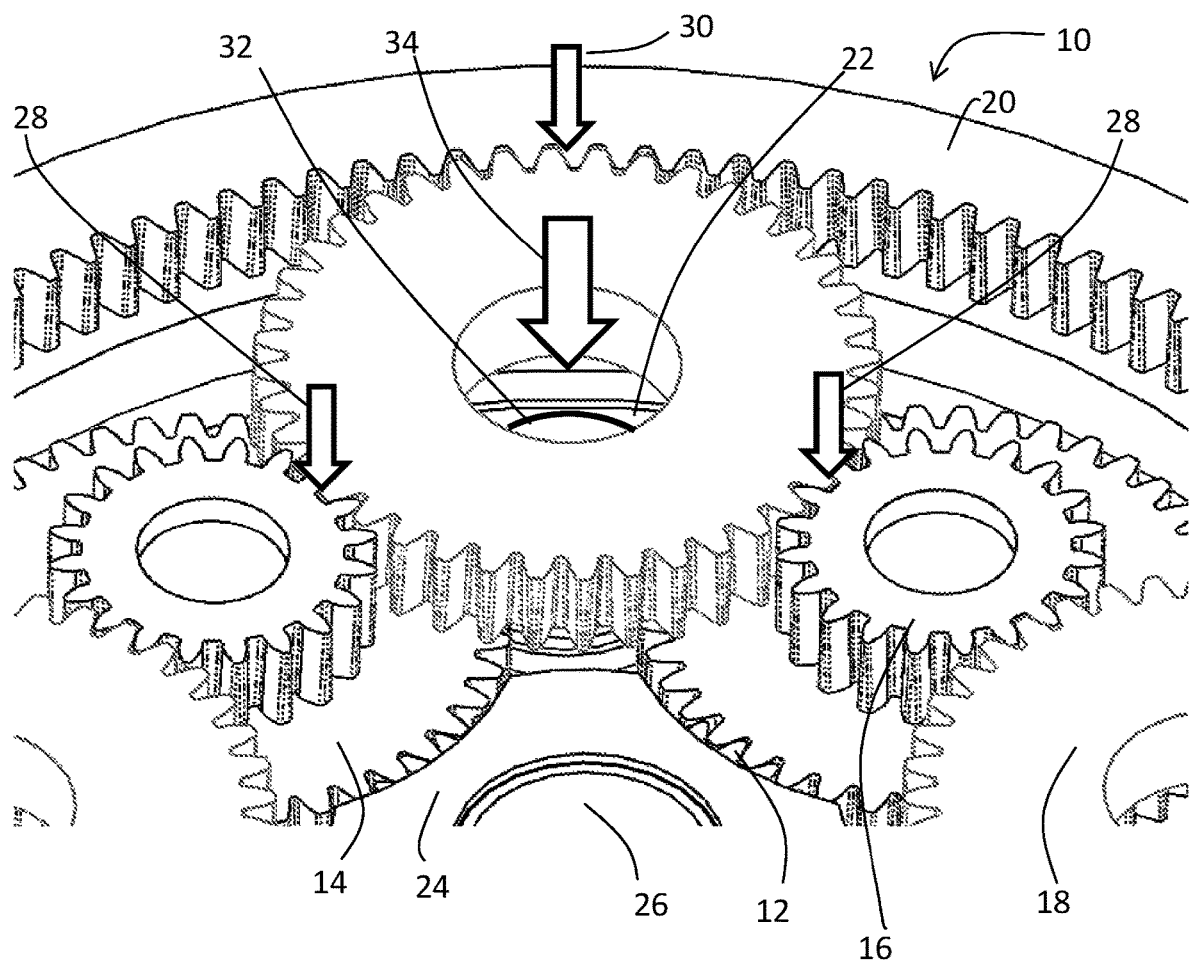
FIG. 3 is a closeup view showing a force on and meshing points of a floating gear of the torque amplifier of FIGS. 1 and 2.

A mechanism to allow the floating of the second planet gears 18 is illustrated in FIG. 3. As shown in FIG. 3, each floating gear 18 has three gear mesh contacts to position it in the XY directions; two first gear mesh positions marked by first arrows 28 where the floating gear 18 meshes with two smaller diameter gears 16 in the first planet stage, and one mesh position marked by second arrow 30 where the floating gear 18 meshes with the ring gear 20. The gear mesh in each of the above mesh positions prevents rotation of the floating gear around an axis that extends from the gear mesh to the rotation axis of the floating gear. The combination of rotational constraint on each of these three intersecting axes provides a fully constrained support of the floating gear with regard to its attitude relative to the housing. Each of the gears in this exemplary embodiment is tapered in a direction that allows axial loading of the floating gears to preload all of the gears in the load path between the sun gear and the ring gear. The downward (axial) force from the floating gear is transferred through the $1^{st}$ planet gear (which can also float axially) to the sun gear to remove backlash from all gear interfaces in load path from sun gear to ring gear.

By using a bearing on the 1st planet set that allows for a small amount of axial displacement, but ensures that the gear does not rotate about a horizontal axis out of plane, the applied downward magnetic force can be transferred from the floating 2nd planet 18 to the 1st planet, and then to the sun gear 12. This ensures that with the proper downward force on the floating gear/s, backlash in any of the gear interfaces is eliminated. The gear meshing areas, along with the bearing/bushing on the first planet axis, ensures that any moments generated from the offset axial forces do not cause the gear to rotate out of plane and cause additional problems with gear tooth meshing. This may be accomplished on the first planet gears by a pair of roller bearings or another style of bearing such as needle bearings which allow some axial movement.

The tapered interface between the two first stage gears 14 and 16 forming first planets and the floating gear forming second planets 18, and between the output ring 20 and the floating gears, provides XY positioning when an axial preload is applied to the floating gear.

Axial preloading of the floating gear can be provided by a number of means including but not limited to a permanent magnet in the housing attracting a steel floating gear or permanent magnet in the floating gear, an electromagnet in the housing attracting a steel floating gear or permanent magnet in the floating gear, or a spring preload preferably acting against a bearing in the floating gear and with enough compliance to allow both axial displacement of the floating gear and XY displacement as the floating gear finds a best-fit position in the XY direction.

In the embodiment shown in FIG. 3, a magnet 32, which may be a permanent magnet or an electromagnet, attracts a steel second planet gear 18 which provides the axial force indicated by large arrow 34.

A permanent or electromagnet 32 between a housing 22 and each of the tapered floating 2nd planet gears 18 may provide a pre-load to the system in order to take up any backlash. Alternatively, a force may be mechanically applied to the top or bottom of the gear 18 to provide the downward force.

Figure 21:
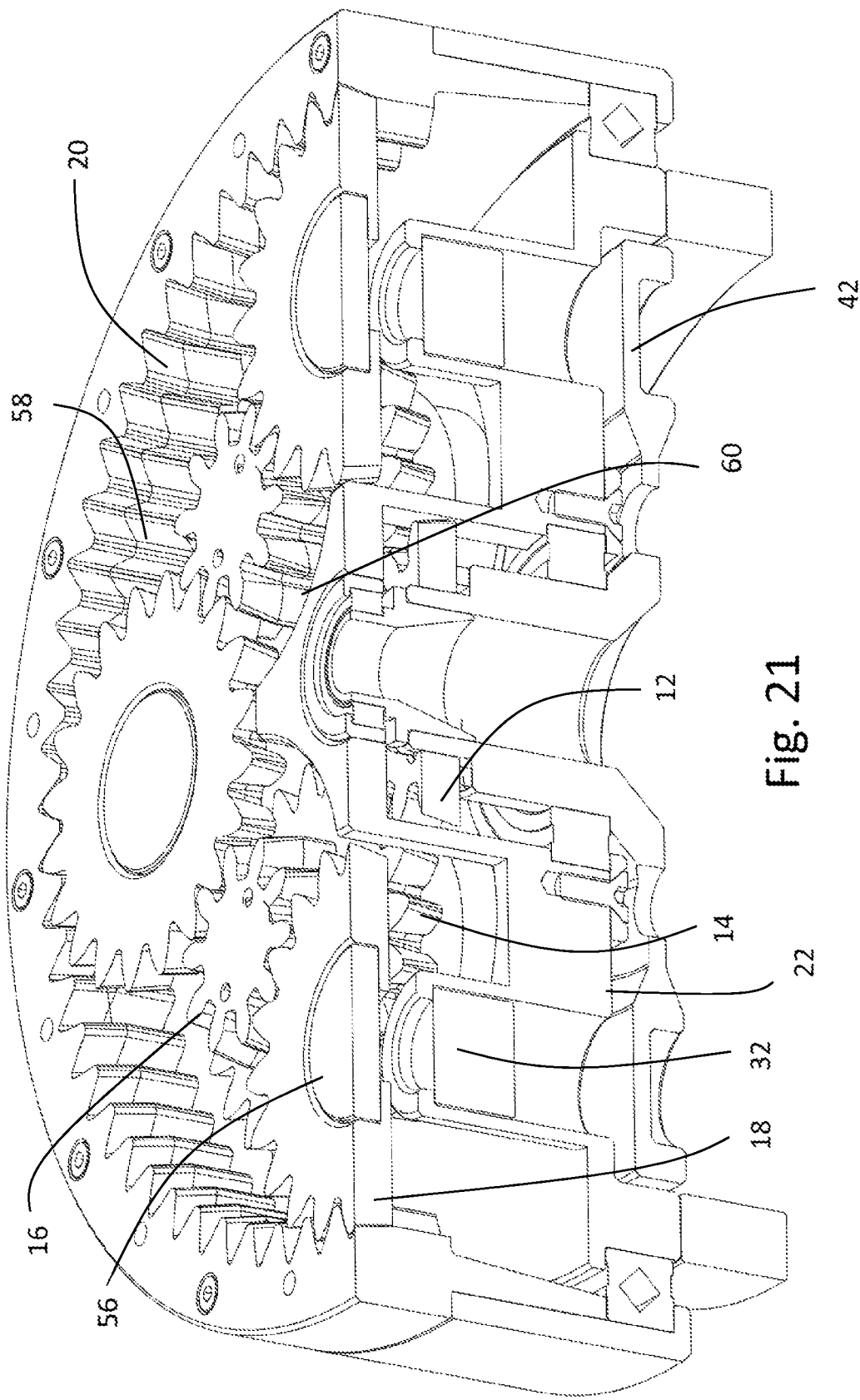
FIG. 21 is a perspective view of a torque amplifier having magnets in outer planet gears.

The second planet gear 18 may also have a magnet 56 as shown in FIG. 21. In this way, the second planet gear 18 may be made of a non-magnetic material and still receive an axial force from permanent or electromagnet 32. In FIG. 21, a rotor 42 and housing 22 are shown. The housing component shown may be a stator depending on the embodiment, but electromagnetic elements for causing the rotor and stator to act as an electric motor are not shown. In some embodiments a lower stator, not shown in this figure, may also be added. In the embodiment shown, the teeth of ring gear 20 have radial extensions 58 and the teeth of smaller gear 16 have radial extensions 60. These extensions help maintain engagement of the teeth in the event of radial misalignment of the gears. Such extensions may also be included in other embodiments.

Figure 4:
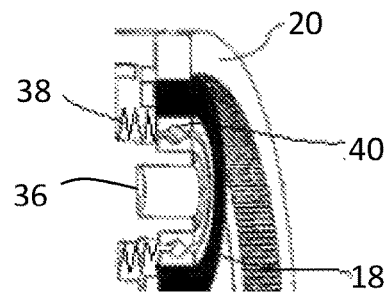
FIG. 4 is a schematic view showing a spring attached to a bearing as an alternative means to apply a force to a planet gear.
Figure 22:
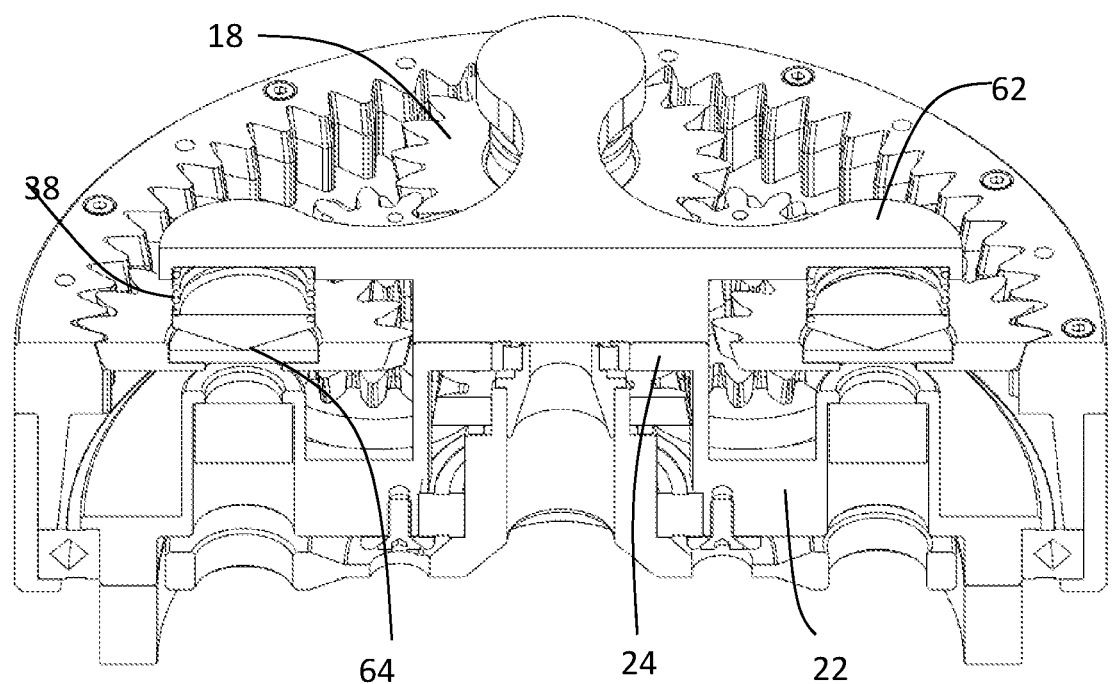
FIG. 22 is a cutaway perspective view of a torque amplifier having springs attached to planet gears.

An example of a mechanical application of force is shown in FIG. 4. In this schematic example, a second planet gear 18, is on a shaft 36 instead of free floating. Components in this figure are not necessarily to scale. Springs 38 which are connected to the housing and to inner portions of bearings 40 which are slideably supported on the shaft; the inner portions of bearings 40 rotatably support outer portions of bearings 40 on which the second planet gears are mounted. The springs 38 push or pull on the bearings to apply the axial force to the second planet gear 18. In this schematic example, ring gear 20 is shown but the first planet gears and smaller gears are omitted. Another example is shown in FIG. 22. In this example springs 38 are connected to an upper portion 62 of housing 22 which is connected in this embodiment to the rest of housing 22 through the cap 24. A pivotable connection 64 connects the springs 38 to the floating planet gears 18. The springs could also connect to the floating planet gears from below, directly from the housing and could push or pull. In any embodiment, the axial force applied could be in either direction, with the tooth taper direction configured accordingly.

As shown in the schematic example in FIG. 4, the second planet gears need not be floating; they can also be on shafts 36 mounted on the housing so long as they are axially displaceable on the shafts. Having the gears floating provides the advantage of allowing them to find a best-fit position between the three contacts to compensate for size or position variations of elements. In another embodiment, the compound first planet gear sets comprising the larger gears 14 and smaller gears 16 could be floating and the second planet gears 18 fixed. In other embodiments, the second planet gears 18 could be compound gears and the first planet gears simple or compound. In a reducing gearbox with a sun gear as input and ring gear as output, the second planet gears being compound gears results in the larger gears of the second planet gears overlapping the ring gear. Either the second planet gears or the first planet gears may be floating gears.

In an embodiment, the gears of the compound gears may be axially movable but rotationally fixed with respect to one another, and connected for example by a spring. This may help balance the axial forces passing from the second planet to the first planet relative to those passing to the ring gear. Such balancing may also be accomplished by applying an axial force to the ring gear or sun gear.

In an embodiment, permanent magnets are combined with variable power electromagnets to provide an axial preloading force on the floating gears as well as an adjustable preload as a result of energizing the electromagnets. As a result, low gear friction can be achieved at low torque conditions for low backdrivability friction and low wear, while the axial preload can be increased under increased torque conditions to maintain a zero backlash characteristic at high torque levels where the axial reaction on the gears will be higher.

Tapered teeth ensure that backlash is taken up in either rotation direction. Any gap between gear teeth on either side of the tooth will allow the floating gear to displace axially until there is full engagement of the teeth, eliminating backlash. The floating gear is restrained in three places by the first stage planet gears and the ring gear such that no additional support is required. The gear centers itself in this position as a result of the applied downward magnetic force.

Gear Tooth Profile

Any gear tooth profile may be used for the torque amplifier. An involute profile may be used in order to allow for some small deviation in the centre distance without negatively affecting the gear meshing. This ensures that when the floating planet gear moves axially or radially, the teeth mesh smoothly.

A mirrored helical tooth shape may be used a mirrored helical gear shape to achieve the tooth taper, although other methods may also be used. This mirrored helical design allows one side of each tooth to be cut with one helical operation such as by cutting with a gear tooth hob or shaping cutter, and the other side of the tooth to be cut with an opposite helical operation, resulting in a tooth that meshes smoothly, while allowing the taper to take up any gap in either rotation direction. An example of a mirrored helical tooth shape is shown in FIGS. 5 to 8.

Figure 5:
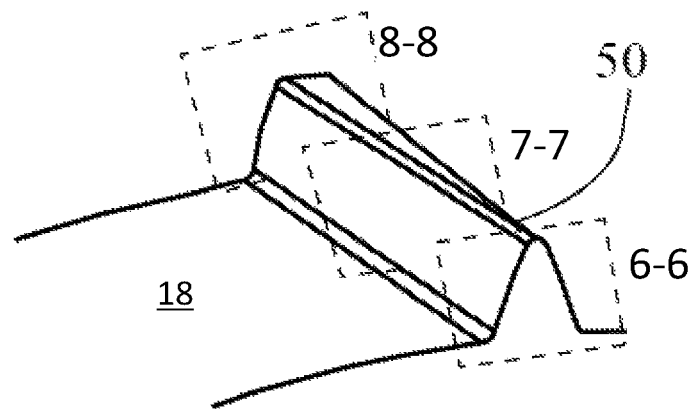
FIG. 5 is a closeup perspective view of an exemplary tapered tooth shape.
Figure 6:
FIG. 6 is a cross section of the tooth of FIG. 5 at a narrow end of the tooth.
Figure 7:
FIG. 7 is a cross section of the tooth of FIG. 5 at a middle portion of the tooth.
Figure 8:
FIG. 8 is a cross section of the tooth of FIG. 5 at a wide end of the tooth.

FIG. 5 shows a single exemplary tooth 50 on a floating gear 18. Other teeth would be present but are not shown. A corresponding tooth shape may be used on each of the other gears. Only gears that mesh need to have corresponding tooth shapes, so it is also possible for sun gear 12 and first planet gears 14 to use a different, non-corresponding tooth shape than smaller gears 16, second planet gears 18 and ring gear 20. Sections 6-6, 7-7 and 8-8 show planes corresponding to the views of FIGS. 6, 7 and 8 respectively. FIG. 6 shows a cross-section of the front of the tooth 50. FIG. 7 shows a cross-section of the middle of the tooth 50. FIG. 8 shows a cross-section of the back of the tooth 50. The teeth and preload work together to eliminate backlash. The preload, whether created by a spring, magnet or electromagnetic or other biasing means, will pull the teeth so that the tapers of the corresponding teeth are brought into an engaging contact. The preload can push the floating gears away from the stator and other gear or pull the floating gears towards the stator and other gears, depending on the orientation of the corresponding tapers. It is preferable to have the planetary gears pulled towards the stator for assembly purposes.

Figure 9:
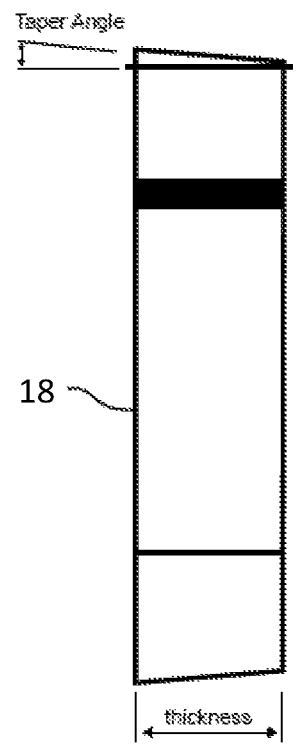
FIG. 9 is a side view of a gear with teeth having a taper angle.

In another embodiment of the tooth shape, the addendum and dedendum of the sun, planets and annulus are adjusted such that a tapered tooth effect is achieved without changing the aspect ratio. The details of this are described as follows and as shown in FIGS. 9 to 15. In this embodiment, as shown in FIG. 9, the one side of a gear may have the tips of the gears extend farther, the change in extension of the gear tips over the thickness being a taper angle. The gear pitch however may remain constant over the thickness of the gear. The dedendum and addendum of the sun, planets, and annulus at the top of the taper and at the bottom of the taper may be determined using the change in the diameter required for a prescribed taper angle and gear body thickness.

FIGS. 10 to 15 show further details of a design of a tapered gear tooth profile with such a taper angle. The design of the gear shown may be used with the torque amplifier shown in FIGS. 1-3 or in other applications.

Figure 10:
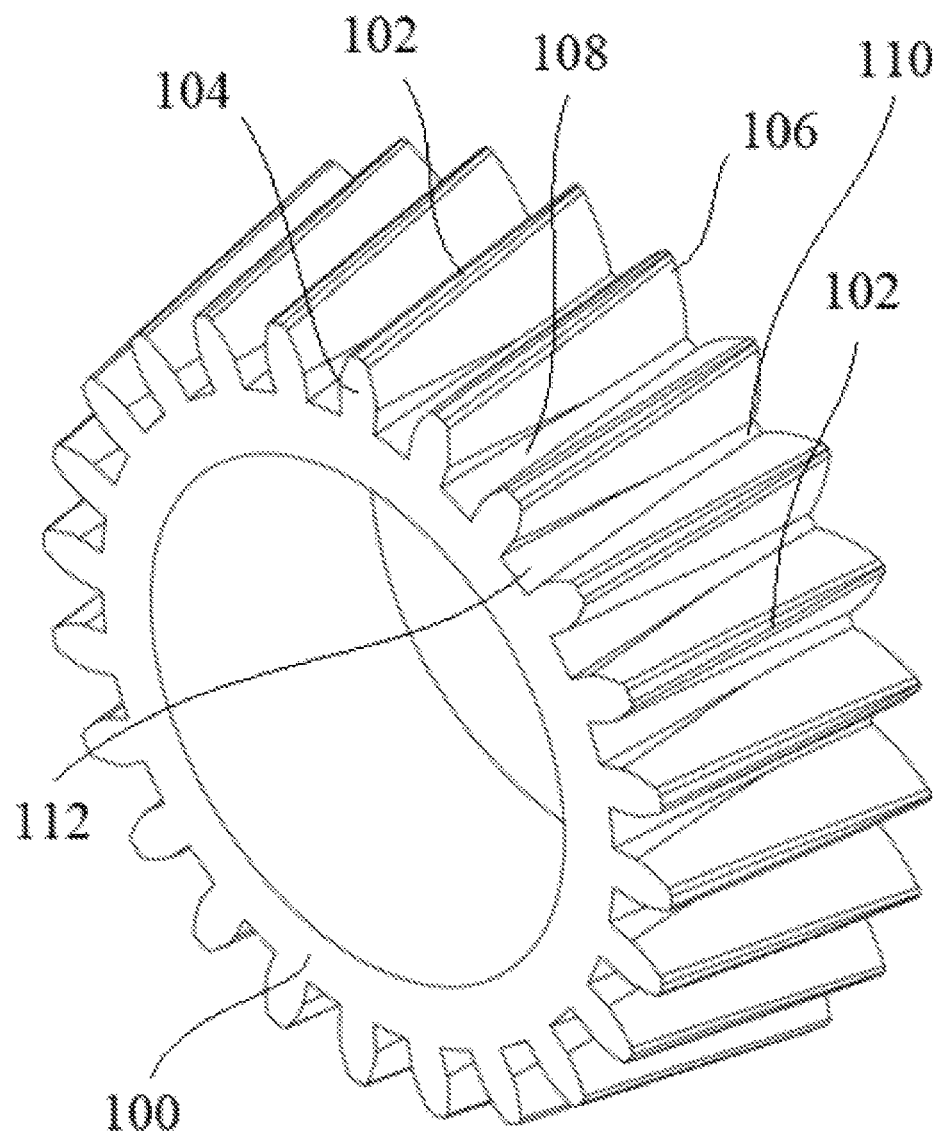
FIG. 10 is a perspective view of an exemplary gear having tapered teeth.
Figure 11:
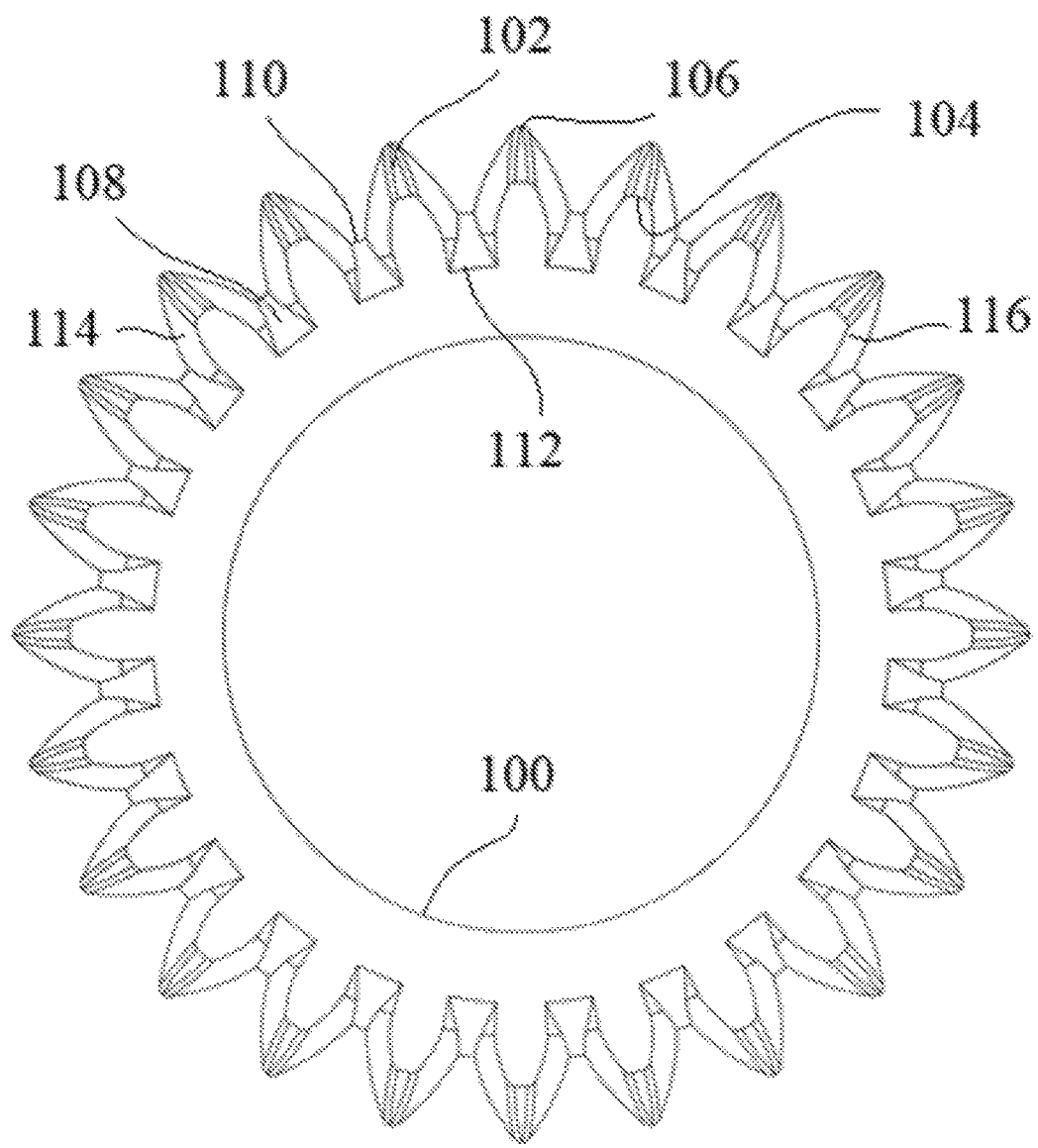
FIG. 11 is an axial view of the gear of FIG. 10.

As shown in FIGS. 10 and 11, there is a gear 100 having a plurality of teeth 102. The teeth are tapered so that a back end 106 of each tooth extends radially outward from the central axis of the gear further than a front end 104 of each tooth. Similarly, gaps 108 between each tooth are tapered. A back end 110 of each gap extends radially outward from the central axis of the gear further than a front end 112 of each gap. The addendum of each tooth, as defined by its sides 114 and 116 are shifted in accordance with the taper, as shown in more detail in FIGS. 13 to 15.

Figure 12:
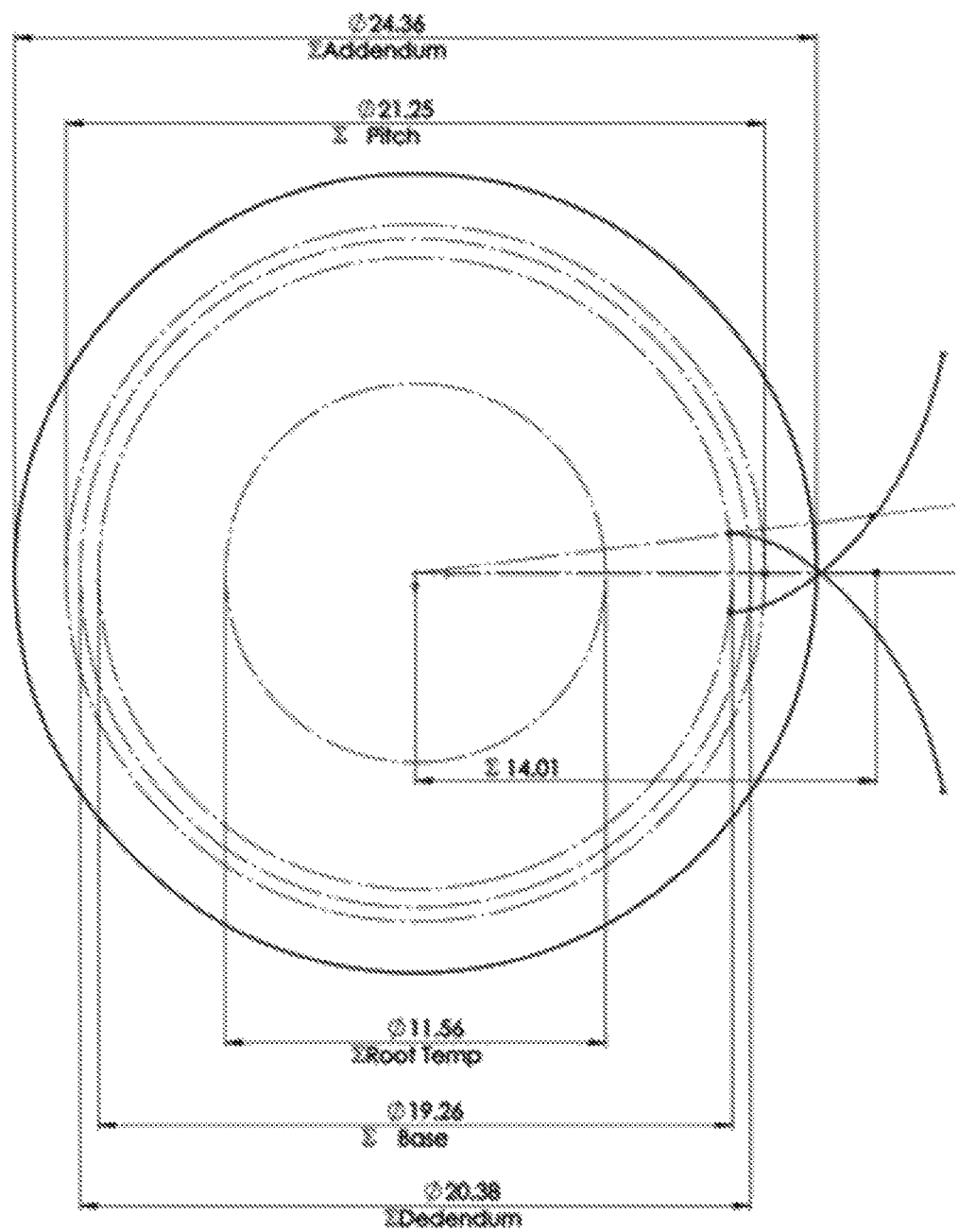
FIG. 12 is a diagram showing various diameters of the gear of FIG. 10.

FIG. 12 shows an exemplary sketch of a positive addendum shift profile and labeled notable diameters including addendum circle, pitch circle, base circle and dedendum (root circle) diameters.

Figure 13:
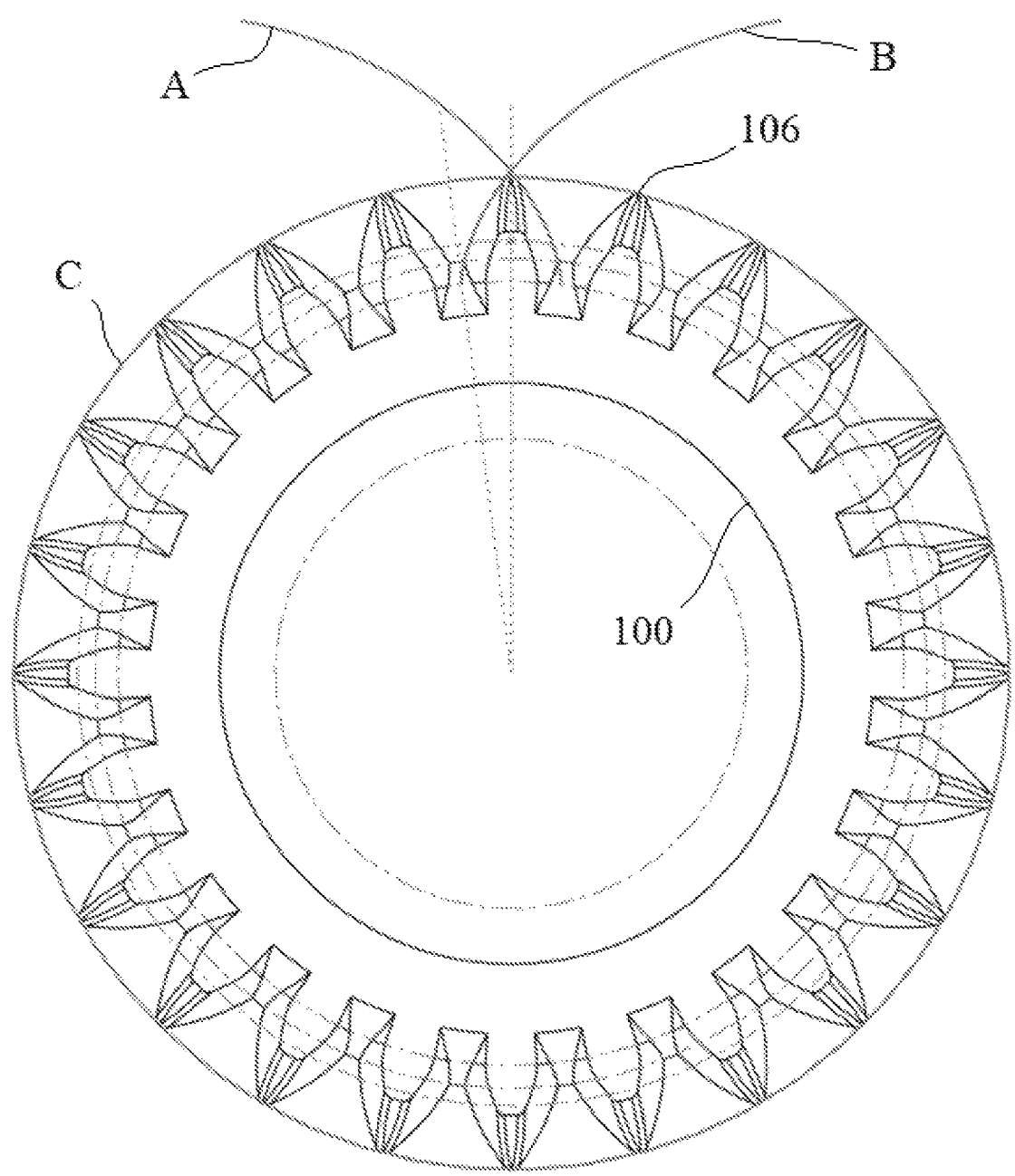
FIG. 13 is a diagram showing diameters and tooth side arcs of the gear of FIG. 10 at first ends of the teeth.
Figure 14:
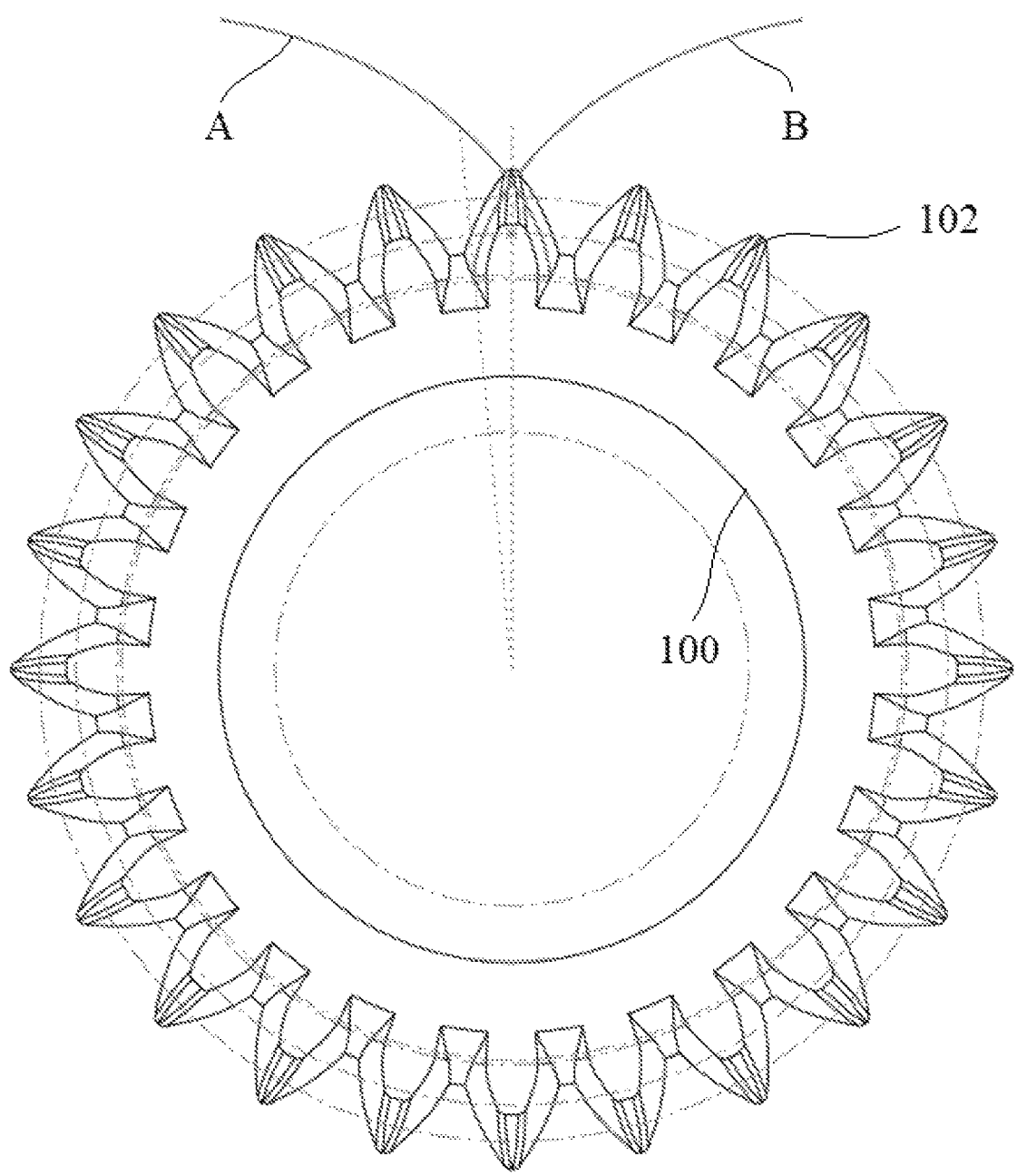
FIG. 14 is a diagram showing diameters and tooth side arcs of the gear of FIG. 10 at middle portions of the teeth.
Figure 15:
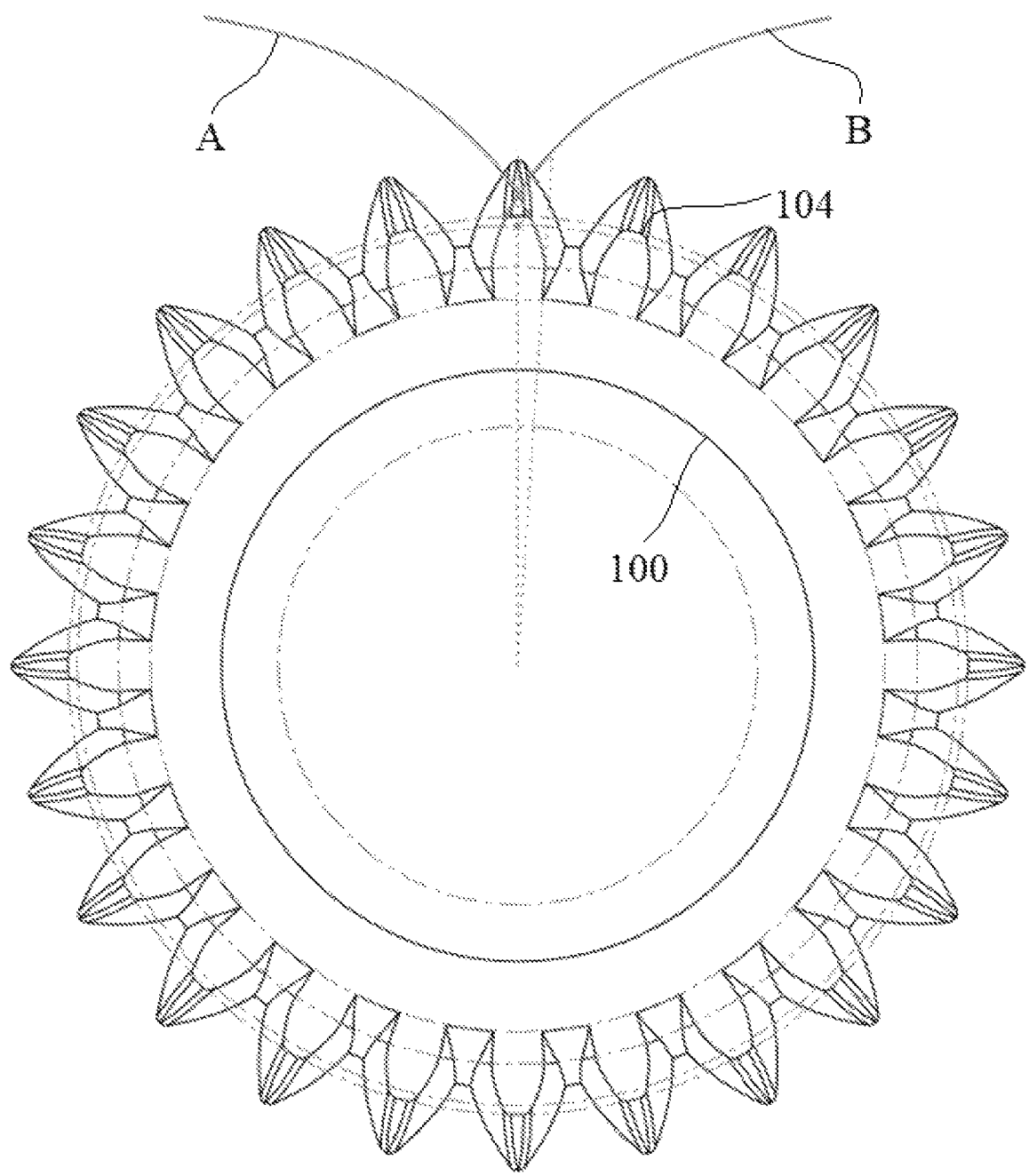
FIG. 15 is a diagram showing diameters and tooth side arcs of the gear of FIG. 10 at second ends of the teeth.

FIGS. 13 to 15 show the gear tooth profile at three points along the length of a tooth. FIG. 13 shows the shape of the addendum defined by lines A and B through the back 106 of each tooth. FIG. 14 shows the shape of the addendum defined by lines A and B through the middle of each tooth 102. FIG. 15 shows the shape of the addendum defined by lines A and B through the front 104 of each tooth. The midplane is used to define the tooth profile in its standard configuration. On either axial end of the gear, an addendum shift is completed, shifting the gear tooth upward or downward. Between these three planes, there is a linear interpolation of the gear tooth.

Typically, an addendum shift is completed across the whole gear length. By varying the addendum shift across the length of the tooth, and combining a conical taper of the gear tooth body, a tapered gear is created. When combined with a second tapered gear, using the same addendum shifts, the two gears mesh when the positive shift face of one gear meets the negative shift face of the other.

For each of the sun, planets, and annulus gears, the change in the addendum and dedendum due to the taper of the gear body resulted in variation of the tooth profile as different sections of the mathematical involute were used.

A tapered gear allows preloading by applying an axial load to the gear. This has the effect of eliminating backlash between the gears. Additionally, it allows a gear to be more easily injection moulded.

The taper angle of the body may be selected in coordination with the materials of which the gears are comprised such that the taper angle ensures the highest possible axial load but remains outside of the region considered self-locking.

The design can be tailored to provide the desired gearing ratio and outer diameter by adjusting the gear diameters and teeth numbers accordingly.

The pitch diameter of each of the gears (in the case of a compound gear, the pitch diameter of each gear making up the compound gear) may be chosen to be constant across the respective thickness of the gear body. A pure mathematical involute may be used for the teeth on each of the gears in order to prevent backlash from originating as a result of the tooth profile.

Tooth tapers may be adjusted to match the axial deflection desired in the floating gear. In general, a higher tooth taper angle results in a smaller axial deflection of the floating gear for a given change in gap between gears.

Materials

Any material common to gears may be used for the construction of this torque amplifier. Examples include plastic and/or steel and/or bronze. Spinodal bronze may be used on alternate gears in order to allow operation in some applications without the requirement for additional lubrication. A magnetic material such as steel or iron may be used for the floating gear in order for it to respond to the magnetic field, generating the downward magnetic force necessary to preload the tapered gears and eliminate backlash.

Motor

The torque transfer device may be driven by a motor. The motor may be for example an axial motor comprising a double-sided rotor 42 with an upper stator 44 above and lower stator 46 below the rotor. The stators 44 and 46 together make up portions of housing 22. The double stator design minimizes the net magnetic force on the rotor. The magnetic force between the rotor and stators is reacted on both the inner and outer diameter of the motor at contacts between the two stators. In the embodiment shown, there is an annular contact 48 between stators near the outer diameter of the rotor 42 and the cap 24 serves as another contact. Shafts 52 for first planet gears 14 may be rigidly connected to the housing. First planet gears formed by larger gears 14 and smaller gears 16 may rotate on shafts 52 using bearings or bushings located for example as indicated by reference numeral 54. Second planet gears 18 are not shown in this figure.

Brake

For many applications such as robotics, a brake is required on an actuator to prevent the device from spinning when power is lost to the system. Disclosed here is an integrated brake with redundancy and low power consumption such as for use with the reflex torque amplifier described above.

Figure 17:
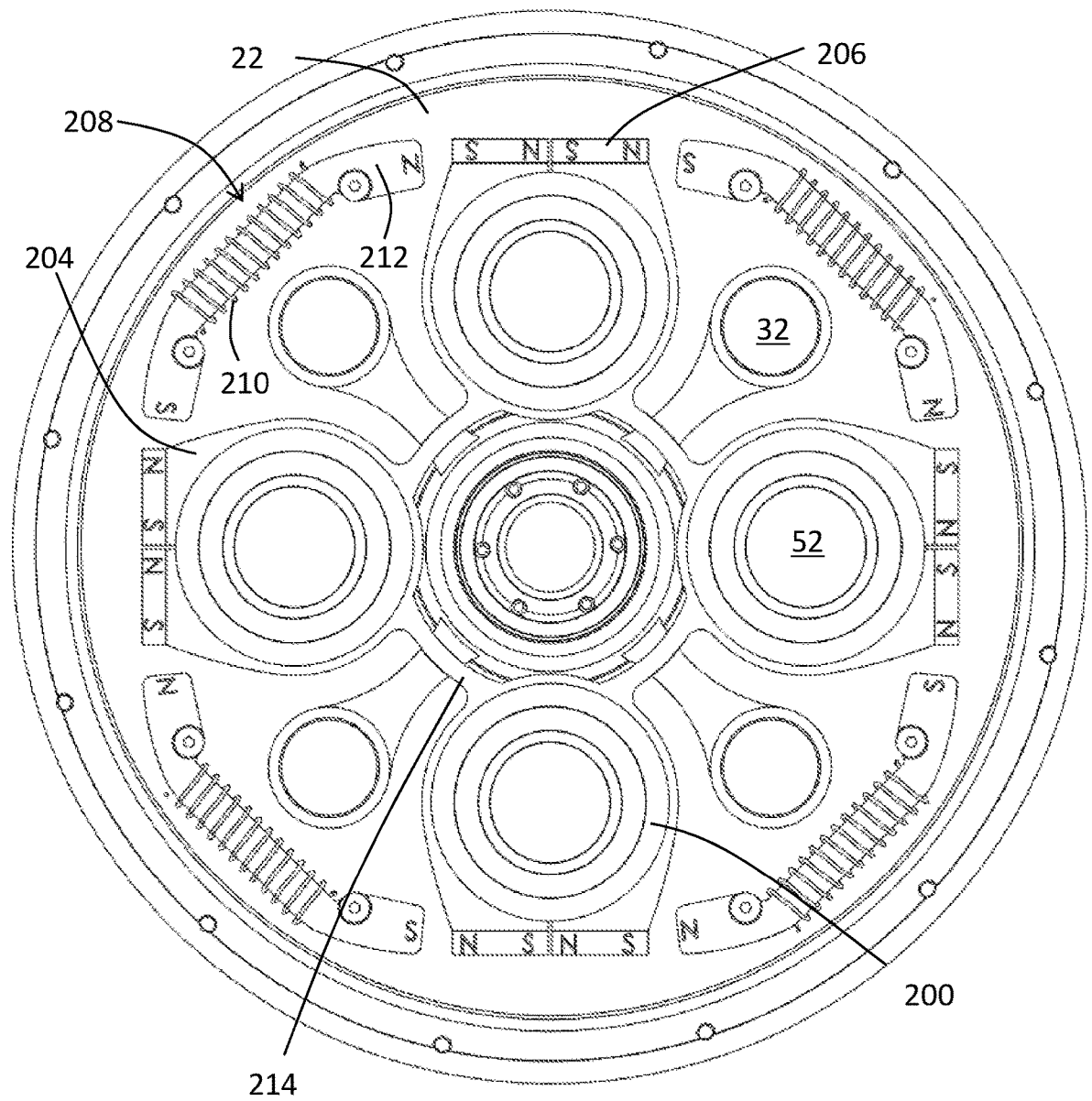
FIG. 17 is a top cutaway view of an actuator of FIG. 16 also comprising a brake, with the brake in a gripping position.
Figure 18:
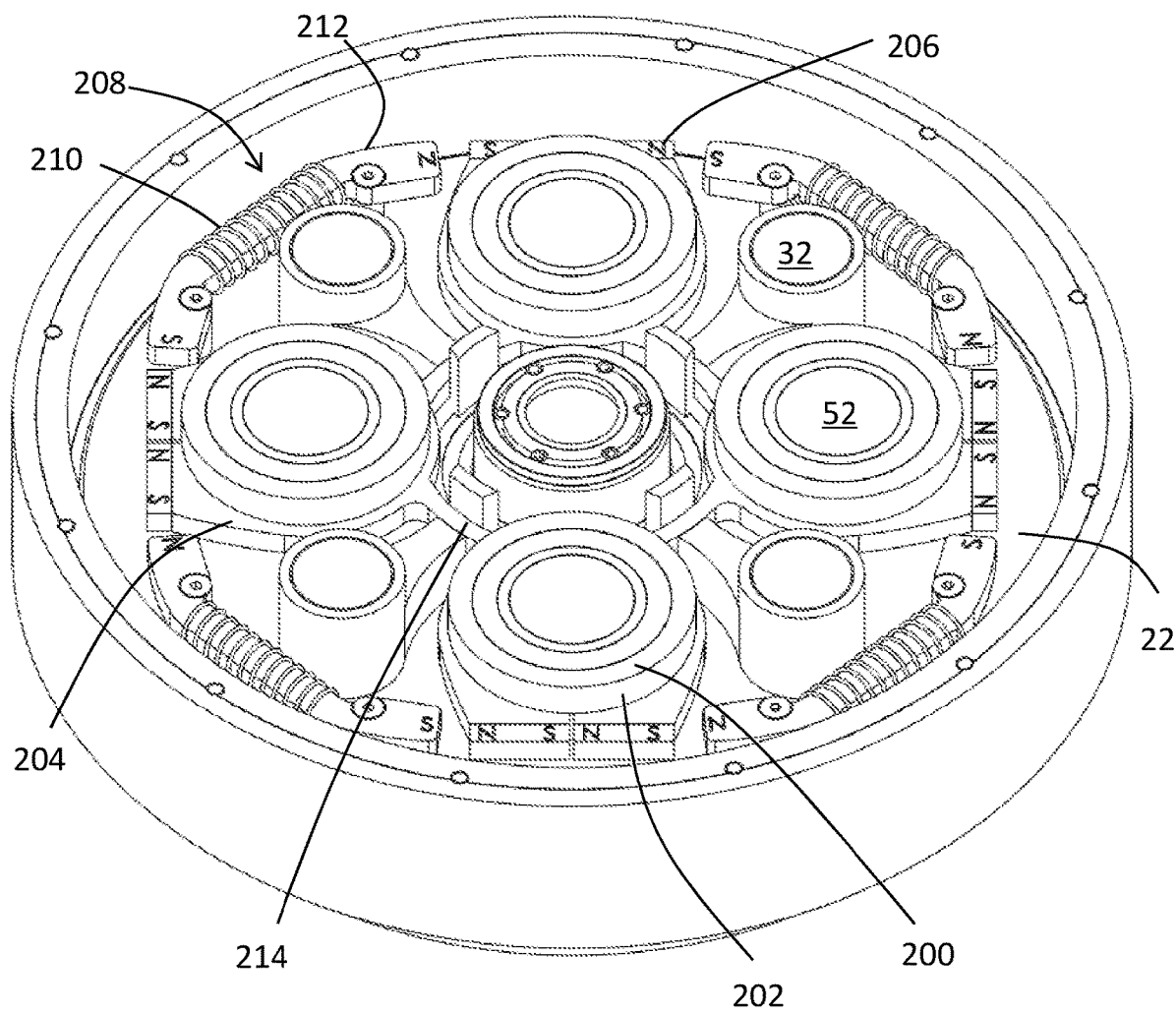
FIG. 18 is a perspective view of the actuator of FIG. 17.

FIG. 17 is a top view and FIG. 18 is a perspective view of an actuator as described above, but including a brake, shown in gripping position. First planets include portions 200 that have rotary friction surfaces 202. A band clamp 204 surrounds the cylindrical surface 202 of portion 200 and acts as a brake when power is lost to the actuator, as shown in this gripping position shown in FIGS. 17 and 18. Permanent magnets 206 are fixed to the split end of the band clamps and pull together to clamp the band clamp 204 around the cylindrical surface 202.

Electromagnets 208 having coils 210 and cores 212 are shown in FIGS. 17 and 18, but will be described in relation to FIGS. 19 and 20.

The band clamps may be individual components or may be attached as shown here by bridges 214 to adjacent band clamps. Attaching the band clamps together may simplify assembly and construction by turning all of the band clamps (for example three or four) into a single component.

FIG. 17 is a top view and FIG. 18 is a perspective view of an actuator as described above, but including a brake, shown in an energized position where the band clamps are held away from the portions 200.

When the electromagnets 208 are energized they pull on the permanent magnets 206 to pull the band clamps 204 apart so the portion 200 and attached compound gears can spin freely. To reduce power consumption, when the band clamps 204 are disengaged and moved to the position shown in FIGS. 19 and 20, the attraction of the permanent magnets 206 to the steel core 212 of the electromagnets 208 provides almost, but not quite enough attraction force to keep the band clamps 204 open. The remaining force must be provided by the coils 210. The band clamps 204 are biased together so that when power to the coils 210 of the electromagnets 208 is lost, the biasing force pulls the band clamps away from the electromagnets to cause the band clamps to tighten around the portions 200 to prevent spinning of the gears and the rest of the actuator.

The biasing force may be supplied by the attraction of the permanent magnets to the electromagnets or by other forces such as a spring force of the band clamps.

In this way a very strong clamping force can be achieved when not powered and very little holding force from the electromagnets need be used when the brake is disengaged.

An expandable section such as flexible bridges 214 between the band clamps is preferred to allow the band clamps 204 to move freely outward when engaged and to move radially inward when disengaged. With precise enough location of the electromagnets 208, the band clamp may not need a rigid attachment point to the housing to provide a rigid brake effect.

Figure 19:
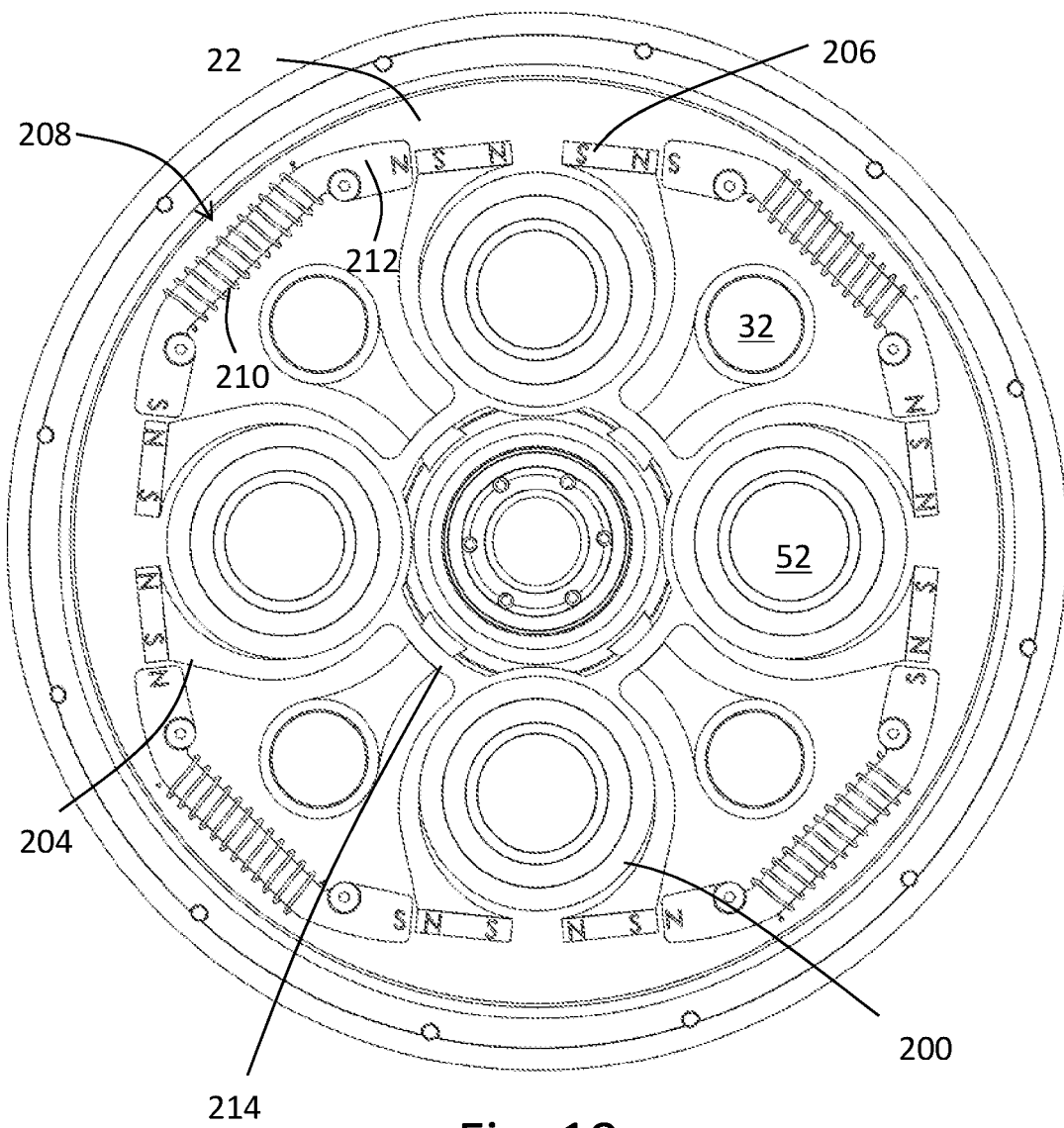
FIG. 19 is a top cutaway view of an actuator of FIG. 17, with the brake in an energized position.
Figure 20:
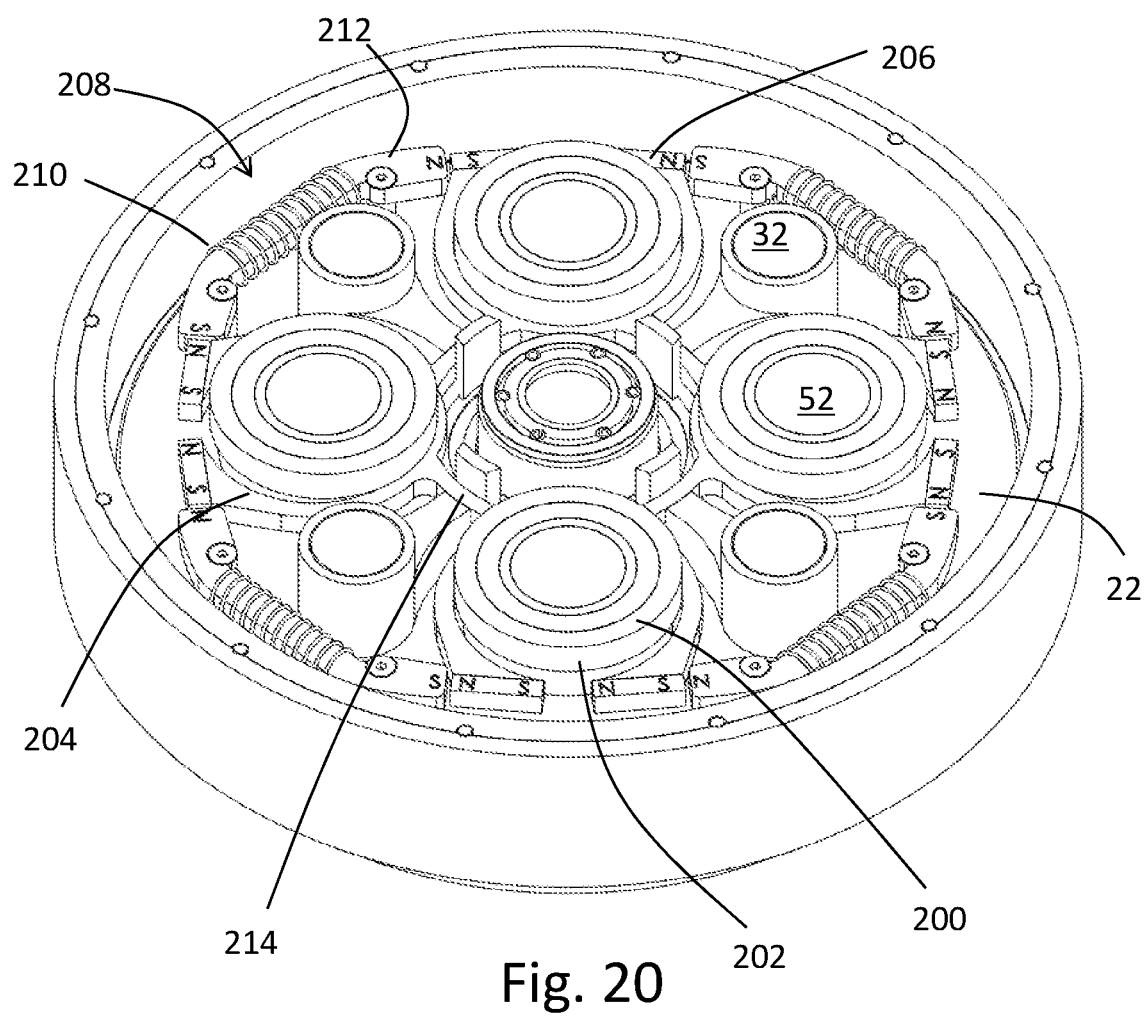
FIG. 20 is a perspective view of the actuator of FIG. 19.

When the power is removed from the electromagnets 208, the band clamps 205 snap from the position shown in FIGS. 19 and 20 to the gripping position shown in FIGS. 17 and 18. When power is restored, in an embodiment the electromagnets 208 may be supplied with a burst of power to pull the magnets 206 apart to the energized position shown in FIGS. 19 and 20. In other embodiments, the magnets 206 may be pulled apart by other means such as mechanically, the electromagnets 208 being strong enough to hold the magnets 206 in the energized position but not to separate the magnets 206 from the gripping position.

Although each magnet connected to a band clamp may be attracted by a different electromagnet as shown in the figures, a single electromagnet in a horseshoe configuration could also be used to attract both magnets connected to a single band clamp.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A brake comprising;
    a band having a first end and a second end, the band extending circumferentially around a surface of a rotating object, the band being movable between a gripping position contacting the surface of the rotating object and an energized position;
    a first permanent magnet attached to the first end of the band and a second permanent magnet attached to the second end of the band, the first and second permanent magnets arranged to attract each other in the gripping position to cause the band to grip the cylindrical surface;
    the first permanent magnet and the second permanent magnet being biased away from the energized position to move the band to the gripping position; and
    one or more electromagnets arranged to be supplied with current to attract the first permanent magnet and the second permanent magnet to hold the band in the energized position against the bias when current is supplied to the electromagnets.

2. The brake of claim 1 in which the one or more electromagnets are configured to be energized with a first current to move the band from the gripping position to the energized position, and a second current to maintain the band in the energized position, the second current being lower than the first current.

3. The brake of claim 1 or claim 2 in which the first permanent magnet and the second permanent magnet are biased away from the energized position by the magnetic attraction of the first permanent magnet and the second permanent magnet.

4. A combined brake comprising plural brakes as claimed in claim 1, the plural brakes being arranged in a circular arrangement, the bands of each brake of the plural brakes being connected to successive brakes of the plural brakes by flexible bridges.

\* \* \* \* \*